(12) United States Patent
Newbrough et al.

(10) Patent No.: US 7,516,885 B2
(45) Date of Patent: Apr. 14, 2009

(54) TRANSACTION INSTRUMENTS WITH ENHANCED SECURITY PIN AND EXPIRATION DATE GENERATION

(75) Inventors: Keith Newbrough, Parker, CO (US); Peter Robbins, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 362 days.

(21) Appl. No.: 11/422,950

(22) Filed: Jun. 8, 2006

(65) Prior Publication Data

US 2007/0284435 A1 Dec. 13, 2007

(51) Int. Cl.
*G06K 5/00* (2006.01)
(52) U.S. Cl. .................. 235/380; 235/451; 235/492; 235/487
(58) Field of Classification Search .......... 235/380, 235/379, 375, 487, 492, 451; 705/72
See application file for complete search history.

(56) References Cited

U.S. PATENT DOCUMENTS

| 5,450,491 | A * | 9/1995 | McNair ..................... 713/184 |
| 5,939,699 | A | 8/1999 | Perttunen et al. |
| 6,547,132 | B1 | 4/2003 | Templeton et al. |
| 6,827,260 | B2 | 12/2004 | Stoutenburg et al. |
| 6,886,742 | B2 | 5/2005 | Stoutenburg et al. |
| 7,086,584 | B2 | 8/2006 | Stoutenburg et al. |
| 2002/0066042 | A1* | 5/2002 | Matsumoto et al. ......... 713/202 |
| 2002/0153414 | A1 | 10/2002 | Stoutenburg et al. |
| 2002/0156683 | A1 | 10/2002 | Stoutenburg et al. |
| 2002/0166891 | A1 | 11/2002 | Stoutenburg et al. |
| 2003/0105964 | A1* | 6/2003 | Brainard et al. ............. 713/178 |
| 2003/0222135 | A1 | 12/2003 | Stoutenburg et al. |
| 2005/0228724 | A1* | 10/2005 | Frangiosa .................... 705/26 |
| 2006/0161789 | A1* | 7/2006 | Doughty et al. ............. 713/186 |
| 2008/0029607 | A1* | 2/2008 | Mullen ........................ 235/492 |

OTHER PUBLICATIONS

PCT International Search Report mailed Aug. 14, 2008, International Application No. PCT/US07/70642, 11 pages.

\* cited by examiner

*Primary Examiner*—Edwyn Labaze
(74) *Attorney, Agent, or Firm*—Townsend and Townsend and Crew LLP

(57) ABSTRACT

The present invention generally relates to transaction instruments with enhanced expiration date and/or security personal identification number (PIN) generation. The enhanced security PIN generation may be usefully in connection with account information associated with the transaction instrument to verify and/or authenticate the transaction instrument. In certain aspects, the security PIN may be used in connection with account information associated with the transaction information to authenticate the transaction instrument via a synchronization-based authentication process or similar process. By way of example, the account information may be used as a static identifier to indicate identity of the transaction instrument, and the security PIN may be used to authenticate the identity of the transaction instrument.

32 Claims, 7 Drawing Sheets

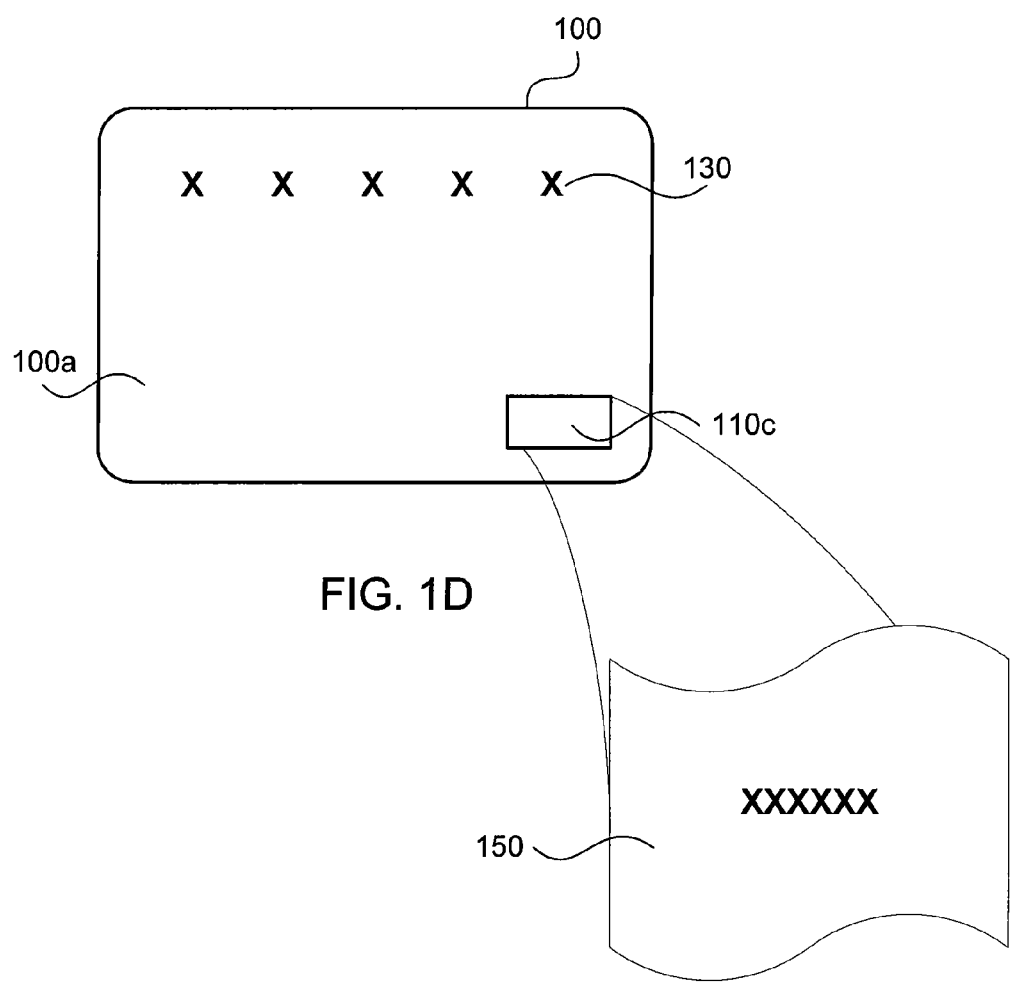

US 7,516,885 B2

TRANSACTION INSTRUMENTS WITH ENHANCED SECURITY PIN AND EXPIRATION DATE GENERATION

BACKGROUND OF THE INVENTION

This application relates generally to transaction instruments.

Transaction instruments, such as presentation and transaction cards, and the use of such instruments to access, e.g., financial or stored value accounts is well known. Examples of such presentation or transactions cards include credit cards, debit cards (including check cards), ATM cards, phone cards, stored value cards, and the like. Presentation and transaction cards are also known to provide advertising, display, or informational items.

When used in financial or transactional matters, such instruments typically contain an account number in some form or another that permits the card holder to gain access to their account, such as when making a purchase. One common way to store the account information is through the use of a magnetic stripe that extends lengthwise along the card. To read the card, a point of sale device, such as the one described in U.S. application Ser. No. 10/116,689, filed Apr. 3, 2002, incorporated herein by reference, may be used. The account identifier that is read from the card may then be electronically transmitted to a processing system in order to complete the transaction. Another way to store the account information is by using a bar code that is read using a bar code reader. Other forms of storage devices include smart chips, RFID tags, MICR lines, and the like.

In particular to capitalize upon online commerce, while reducing the risk of fraud, new methods of payment authentication have been devised. There are address verification services that check the address provided against the billing address with the credit card company. Modern credit cards also have a card verification value (CVV) code imprinted on the back or front of the credit card that is not part of the credit card number (VISA™ refers to the code as CVV2, MasterCard™ calls it CVC2, and American Express™ calls it CID). Authenticating that the buyer has the proper CVV code tends to show the buyer physically has the card. Similarly, some authenticate the customer service number on the credit card. The use of user selected or card issuer selected personal identification numbers (PINs) to authenticate users is also common. However, compromise of PINs and/or loss of physical cards still result in significant identify theft and fraud.

BRIEF SUMMARY OF THE INVENTION

To address these and other needs, the present invention provides transaction instruments with enhanced security PIN generation.

Thus in a first aspect, a transaction instrument with enhanced security PIN generation is provided. The transaction instrument generally includes: a card body; an account identifying mechanism for providing account information associated with the transaction instrument; and a security personal identification number (PIN) generation mechanism, wherein a new security PIN is automatically generated at a predetermined interval and provided via the security PIN generation mechanism.

In certain embodiments, the security PIN generation mechanism comprises a random number generator, and the security PIN generation mechanism automatically generates a new security PIN at a predetermined interval between about 60 seconds and seven days.

In another aspect of the invention, a transaction instrument with enhanced security is provided. The transaction instrument generally includes: a card body; an account identifying mechanism for providing account information associated with the transaction instrument; and an enhanced expiration date generation mechanism, wherein a new expiration date is automatically generated at a predetermined interval and provided via the enhanced expiration date generation mechanism. The transaction instrument may further comprise a security PIN generation mechanism in accordance with the invention, as described herein.

In another aspect of the invention, a method for providing enhanced security to financial transactions using transaction instruments is provided. The method generally includes: initiating a financial transaction between a first party and a second party using a transaction instrument of the invention; providing financial account information associated with the transaction instrument and transmitting the financial account information to a transaction facilitator service provider for verification of the financial account information; providing a security PIN generated by the security PIN generation mechanism and transmitting the security PIN to the transaction facilitator service provider for authentication of the transaction instrument; and authorizing the financial transaction of the financial account information is verified and the transaction instrument is authenticated.

In certain embodiments, the transaction facilitator service provider uses the financial account information as a static identifier to indicate identity of the first party and the security PIN to authenticate identity of the first party via a synchronization-based authentication process or other suitable PIN security/authentication methodology. The security PIN generation mechanism may be configured so as to be recognized as identifiable with the financial account information by the authentication process.

In certain embodiments, the financial transaction is a card not present transaction via telephone or the internet In other embodiments, the financial transaction is a face-to-face transaction, and the financial account information and security PIN are transmitted to the transaction facilitator service provider automatically via the point-of-sale device or entered by hand via the key pad of the point-of-sale device.

These and other aspects will become apparent to one of skill in the art upon reading the disclosure.

BRIEF DESCRIPTION OF THE DRAWINGS

FIG. 1D illustrates an exemplary embodiment of a presentation or transaction card of the present invention including an embedded RFID tag security PIN generation mechanism, and a fob which is configured to read the RFID tag output to thereby display the generated security PIN.

DETAILED DESCRIPTION OF THE INVENTION

The present invention generally relates to transaction instruments with enhanced security personal identification number (PIN) generation. The enhanced security PIN generation may be usefully in connection with account information associated with the transaction instrument to verify and/or authenticate the transaction instrument. In other aspects, the transaction instruments of the invention may optionally include enhanced expiration date generation.

In certain aspects, the security PIN may be used in connection with account information associated with the transaction information to authenticate the transaction instrument via a synchronization-based authentication process, as described in further detail herein. By way of example, the account information may be used as a static identifier to indicate identity of the transaction instrument, and the security PIN may be used to authenticate the identity of the transaction instrument via a synchronization-based process by a transaction facilitator service provider.

In one embodiment, a transaction instrument of the invention includes: a card body; an account identifying mechanism for providing account information associated with the transaction instrument; and a security personal identification number (PIN) generation mechanism, which automatically generates a new security PIN at a predetermined interval. In other embodiments, a transaction instrument of the invention includes: a card body; an account identifying mechanism for providing account information associated with the transaction instrument; an enhanced expiration date generation mechanism, which automatically generates a new expiration date at a predetermined interval; and optionally a security PIN generation mechanism.

Figure 1A:
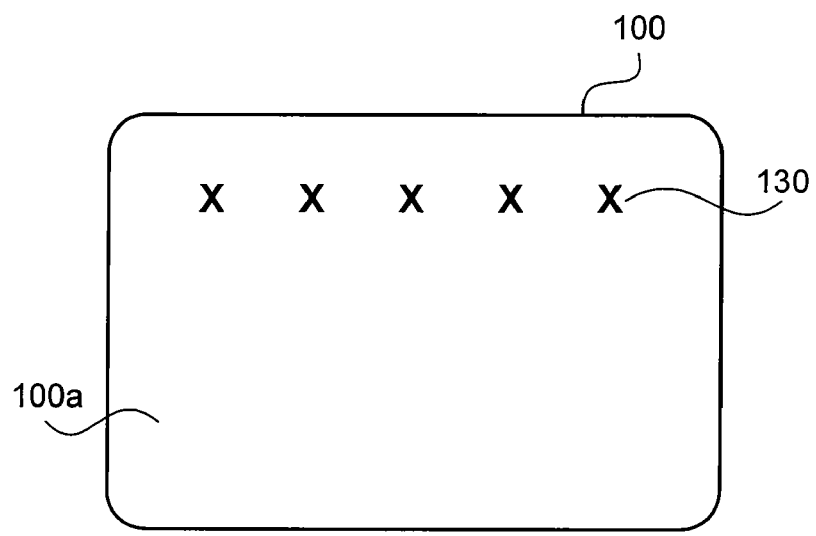
FIGS. 1A and 1B illustrate exemplary embodiments of the presentation or transactions cards of the present invention.
Figure 1B:
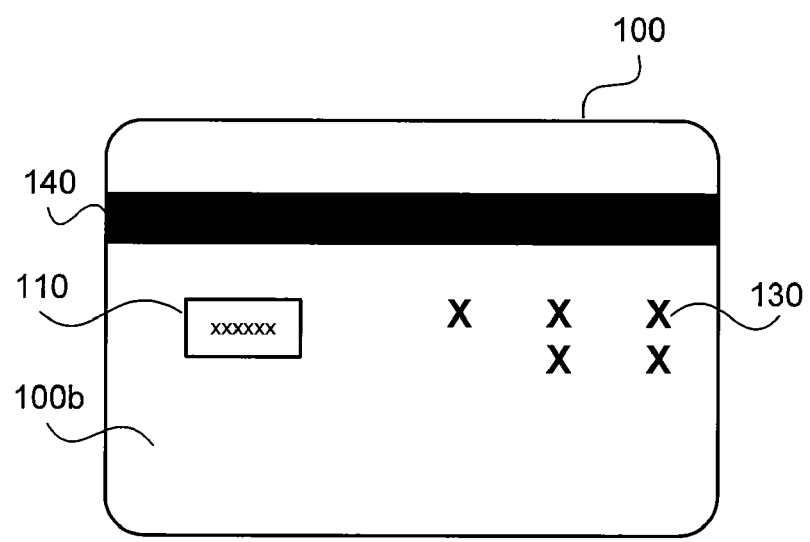

More specifically, with reference to FIGS. 1A and 1B, an exemplary transaction instrument 10 of the invention is illustrated. Transaction instrument 10 may generally include a presentation or transaction card body 100 defining a front surface 100a (FIG. 1A) and a back surface 100b (FIG. 1B), as generally recognized by those skilled in the art. The presentation or transaction card 10 may be any known type of presentation or transaction card, such as credit cards, debit cards (including check cards), automated teller machine (ATM) cards, phone cards, stored-value cards, transit cards, etc. However, the invention is not limited to the particular use of the presentation or transaction card. Further, the card body may be sized and shaped in any manner suitable for the intended use. For instance, in certain embodiments, the transaction instrument may be shaped in a generally rectangular configuration, such as shown in FIGS. 1A and 1B.

Figure 1C:
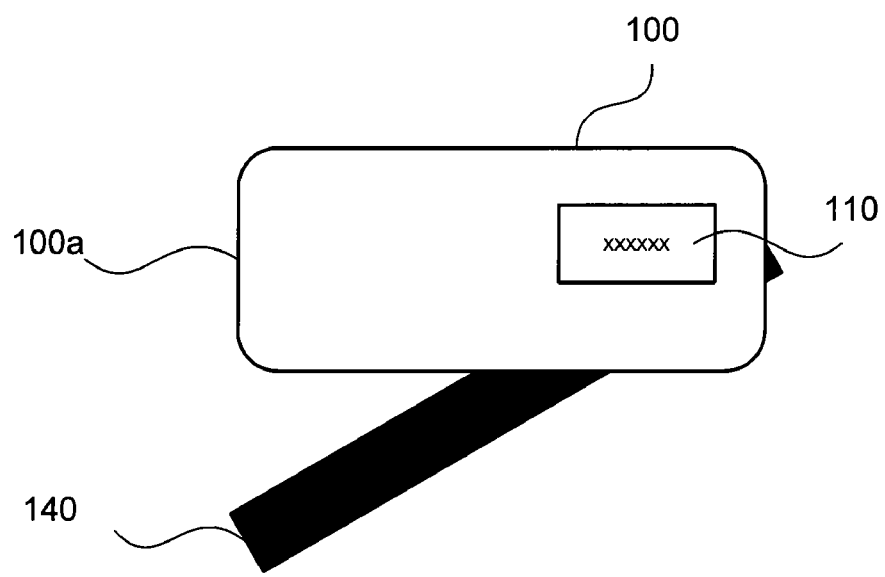
FIG. 1C illustrates an alternative embodiment of a fob presentation or transaction card of the present invention.

In other embodiments, the transaction instrument may be configured as a fob (FIG. 1C), as generally understood by those skilled in the art. In such embodiments, the card body 100 of the fob may be suitably sized and shaped to house at least the desired account identifying mechanisms and security PIN generation mechanisms, as described herein. By way of example, the fob card body 100 may include RFID tags or chips, suitably sized and shaped magnetic stripes, LCD displays, etc., as further described herein.

The card body 100 may also generally be configured to include an account identifying mechanism for providing account information associated with the transaction instrument. In certain embodiments, the account identifying mechanism may include a magnetic stripe 140 or other machine readable mechanism (not shown) such as an embedded memory chip with exposed contacts on the card body, an RFID chip embedded in the card body, bar code information printed on the card body, MICR line, or combinations thereof. In such embodiments, it may be preferable to utilize standard configurations for the machine readable mechanisms so as to aid in compatibility with, e.g., point of sale devices, chip readers, bar code readers, etc. In certain embodiments, such as when the card body 100 is shaped as a fob, the account identifying mechanism may be an embedded RFID chip (not shown) or a magnetic stripe 140, which may optionally be configured so as to hingedly swing from within the body of the fob for storage when not in use, but to swing from within the body of the fob for access when in use.

For instance, it may be desirable for the machine readable components to be sized and shaped to as to be adaptable for use in connection with standard point-of-sale device. Examples of suitable POS devices are provided in the following commonly assigned applications, the entire disclosures of which are incorporated herein by reference for all purposes: U.S. Prov. Pat. Appl. No. 60/147,889, entitled "Integrated Point Of Sale Device," filed Aug. 9, 1999 by Randy J. Templeton et al.; U.S. patent application Ser. No. 09/634,901, entitled "Point Of Sale Payment System," filed Aug. 9, 2000 by Randy J. Templeton et al.; U.S. patent application Ser. No. 10/116,689, entitled "Systems And Methods For Performing Transactions At A Point-Of-Sale," filed Apr. 3, 2002 by Earney Stoutenburg et al; U.S. patent application Ser. No. 10/116,733, entitled "Systems And Methods For Deploying A Point-Of-Sale System," filed Apr. 3, 2002 by Earney Stoutenburg et al.; U.S. patent application Ser. No. 10/116,686, entitled "Systems And Methods For Utilizing A Point-Of-Sale System," filed Apr. 3, 2002 by Earney Stoutenburg et al.; and U.S. patent application Ser. No. 10/116,735, entitled "Systems And Methods For Configuring A Point-Of-Sale System," filed Apr. 3, 2002 by Earney Stoutenburg.

In other embodiments, the account identifying mechanism may include account information 130 printed or displayed on at least one surface thereof, alone or in combination with one or more machine readable mechanism(s). Such information 130 may also include user identification information, promotional information, advertising information, security information, etc.

More particularly, in certain embodiments, the presentation or transaction cards of the invention may generally comprise some form of account identifying mechanism, which may be sufficient to uniquely identify at least one account associated with the transaction instrument. Merely by way of example, a card may comprise a magnetic stripe and/or a bar code. The card identifier, which might be a serial number and/or other string of text and/or numbers, then, might be encoded onto the magnetic stripe and/or represented by the bar code. Those skilled in the art will appreciate the variety of methods that can be used to encode/decode a magnetic stripe and/or translate a bar code. Further, those skilled in the art will appreciate that there are a number of ways known in the art to store information associated with a presentation or transaction card, and any of them may be used as appropriate to store the first and/or second identifiers. Merely by way of example, in some embodiments, the first and/or second identifier may be stored in various ways (such as RFID tag or chips embedded in the card, holograms, etc.) and/or any appropriate scanner, RFID reader and/or hardware may be used to obtain and/or input the first and/or second identifier. Bar codes, track data, account information, etc. may also be printed on the card, as known in the art.

In some cases, the presentation or transaction cards may comprise both a magnetic stripe and a bar code. The magnetic stripe may be used to store a first identifier (such as an account number associated with the instrument and/or the like), which may also be printed, embossed, etc. on the instrument. The bar code may represent a second identifier, which may have some relation to the first identifier, or may incorporate a personal account number, a personal identification number, etc. Merely by way of example, in some cases, the bar code may be a Code 128 bar code known in the art. As recognized by those skilled in the art, the identifier may also be encrypted. The encrypted value representing the identifier can be derived using any appropriate technique, of which many are known in the art. An exemplary technique may comprise 3DES encryption. As used herein, a stored-value instrument identifier can be any single identifier or combination of identifiers, such as a first identifier, second identifier, etc., or any combination thereof.

The presentation and transaction cards of the present invention further include a security PIN generation mechanism 110. The security PIN generation mechanism 110 automatically generates a new security PIN at a predetermined interval. In certain embodiments, the security PIN generation mechanism 110 comprises a random number generator or other suitable secure ID token known in the art of virtual private networks. By way of non-limiting example, the security PIN generation mechanism may automatically generate a new security PIN at a predetermined interval between about 60 seconds and seven days, e.g., about every 60 seconds, 2 minutes, 5 minutes, 10 minutes, 15 minutes, 30 minutes, 1 hour, 12 hours, 24 hours, 2 days, 5 days, etc.

In certain embodiments, the security PIN generation mechanism may include a liquid crystal display (LCD) or other suitable machine readable mechanism(s) for displaying the security PIN as it is generated. By way of example, the security PIN generation mechanism may include an LCD display, a smart chip, a RFID tag, or various combinations thereof. Further, as shown, the security PIN generation mechanism 110 may be visibly located on the back surface 100b of the card body 100, or alternatively may be located on the front surface of the card body (not shown). In other embodiments, the display update mechanism may be integrated into the interior of the card body, and may not be visible on the surface of the card, but rather accessible via, e.g., a smart card, RFID, or other suitable reader.

For instance, with reference to FIG. 1D, transaction instrument 10c is illustrated, wherein PIN generation mechanism 110 is an embedded RFID tag, and external reader fob 150 is configured so as to read and display the security PIN generated by the security PIN generation mechanism 110 and transmitted by the RFID tag. By way of example, external reader fob 150 may be placed in proximity of the embedded RFID tag such that the transmitted signal from the RFID tag is received by the external reader fob 150, and the external reader fob 150 may then display the generated security PIN. Such an external reader fob 150 may be configured in any suitable manner known in the art, and may be shaped in any suitable manner, including but not limited to a key chain shaped device, a POS device peripheral device, a personal computer peripheral device, a credit card shaped device, etc.

In other embodiments of the invention, the transaction instruments of the invention, as described in any of the embodiments above, may include an enhanced expiration date generation mechanism, together with a security PIN generation mechanism or without. In certain embodiments, the enhanced expiration date generation mechanism may automatically generate a new expiration date at a predetermined interval of, e.g., every 24 hours, every seven days, every 30 days, etc., for a predetermined amount of time, e.g., up to about five years, about six years, about seven years, about 10 years, etc. For instance, at the beginning of each new predetermined interval, a new expiration date corresponding to the date of the end of that predetermined interval may be set. Then, if the transaction instrument is reported lost or stolen, or fraudulent activities are detected during that predetermined interval, the enhanced expiration date mechanism may be deactivated, and the transaction instrument may be allowed to expire. Alternatively, if no issues are reported or detected, new expiration dates may be issued for a transaction instrument for extended periods of time without the need to issue and mail new cards, thereby reducing the risk of additional fraud through interception of the card in the mails.

Figure 1E:
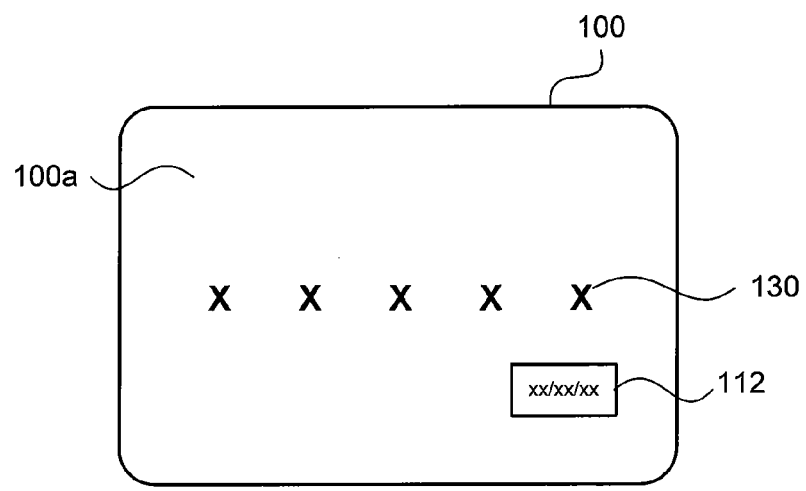
FIG. 1E illustrates an exemplary embodiment of a presentation or transaction card of the invention including an enhanced expiration date generation mechanism of the invention.

By way of example, with reference to FIG. 1E, a transaction instrument 10e of an embodiment of the invention including enhanced expiration date generation mechanism 112 is illustrated. As above with reference to FIGS. 1A-1D, transaction instrument 10e may generally include a presentation or transaction card body 100 defining a front surface 100a and a back surface (not shown), as generally recognized by those skilled in the art. The card body 100 may also generally be configured to include an account identifying mechanism for providing account information associated with the transaction instrument. By way of non-limiting example, the account identifying mechanism may include account information 130 printed or displayed on at least one surface thereof, alone or in combination with one or more machine readable mechanism(s). Such information 130 may also include user identification information, promotional information, advertising information, security information, etc. The transaction instrument 10e may optionally include a security PIN generation mechanism (not shown), as described herein.

In other aspects of the invention, methods for providing enhanced security to financial transactions using transaction instruments are provided. In accordance with the methods of the invention, a security PIN is generated as described herein in connection with a financial transaction to verify and/or authenticate a transaction instrument. In other embodiments, an enhanced expiration date is generated as described herein in connection the use of a transaction instrument described herein. While the methods of the invention will generally be described with reference to the embodiments of FIGS. 1A-1E, it is understood that the methods are not so limited.

Figure 2A:
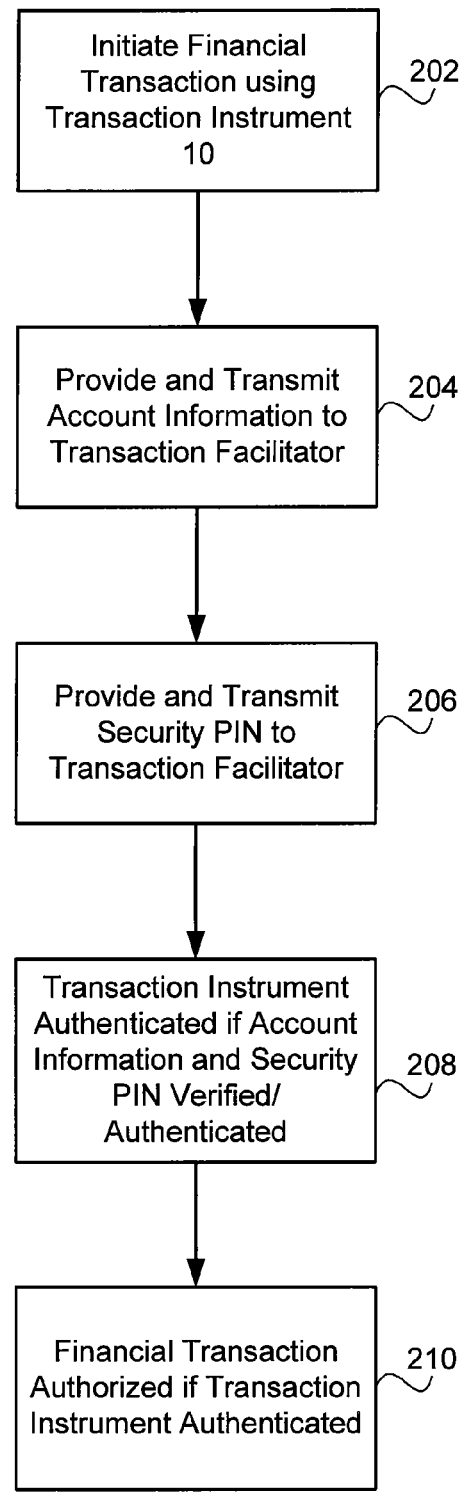
FIG. 2A illustrates an exemplary method of generating and authenticating security PINs in accordance with certain embodiments of the invention.

Turning now to FIG. 2A, a general method 200 is illustrated, wherein at block 202 a financial transaction between a first party and a second party is initiated using a transaction instrument 100 of the invention. Any presentation or transaction instrument 10 of the invention may be used in connection with the methods described herein. For instance, the presentation or transaction instrument 10 of the invention may comprises a card body 100, an account identifying mechanism, e.g., 130, 140, and a security PIN generation mechanism 110. The method then continues to block 204 where financial account information associated with the transaction instrument is provided and transmitted to a transaction facilitator service provider for verification. The security PIN generated by the security PIN generation mechanism is then provided and transmitted the security PIN to the transaction facilitator service provider for authentication at block 206.

Continuing to block 208, the transaction facilitator service provider then verifies account information and authenticates the transaction instrument if the account information and the security PIN are authenticated; and the financial transaction is authorized at block 210 is the transaction instrument is authenticated.

The transaction facilitator service provider may be any suitable service provider for facilitating financial transaction and authenticating the status of transaction instruments, such as the generally known financial networks. In certain embodiments, the transaction facilitator service provider uses the financial account information as a static identifier, e.g., to indicate identity of the first party, and the security PIN to authenticate identity, e.g., of the first party via an authentication process which verifies the generated PIN with the identified transaction instrument using any suitable algorithm for syncing transaction facilitator service provider activities with the security PIN generation mechanism.

More specifically, the security PIN generation mechanism may be configured so as to be recognized as identifiable with the financial account information by the authentication process. For instance, various database(s), including third party database(s) if desired, or similar processes may be used by the transaction facilitator service provider to correlate a signature or secure ID from the security PIN generation mechanism with the account information associated with the transaction instrument so as to authenticate the transaction instrument upon presentation of the security PIN at the appropriate predetermined time interval, as generally understood by those skilled in the art.

The methods of the invention are particularly well suited for "card not present" type financial transactions, such as those via telephone or the internet, where CVV codes are often used. However, the invention is not so limited, as the enhanced security is also useful in face-to-face type transactions. In such transactions, the financial account information and/or the security PIN may be transmitted to the transaction facilitator service provider via machine readable mechanisms, such as a point-of-sale device. Any suitable point-of-sale device known in the art, such as those discussed above, may be used, including those with magnetic stripe readers, RFID readers, smart card readers, etc. By way of non-limiting example, the security PIN may be transmitted to the transaction facilitator service provider automatically via the point-of-sale device (e.g., via an RFID or smart card reader) or entered by hand via the key pad of the point-of-sale device (e.g., after display from an LCD read out).

As described above, the presentation or transaction instrument may be a credit card, debit card (including a check card), automated teller machine card, phone card, stored-value card, transit card, etc. Thus, the methods of the invention may provide enhanced security for a variety of financial transactions, including credit, debit, stored value (i.e., gift card), etc.

Figure 2B:
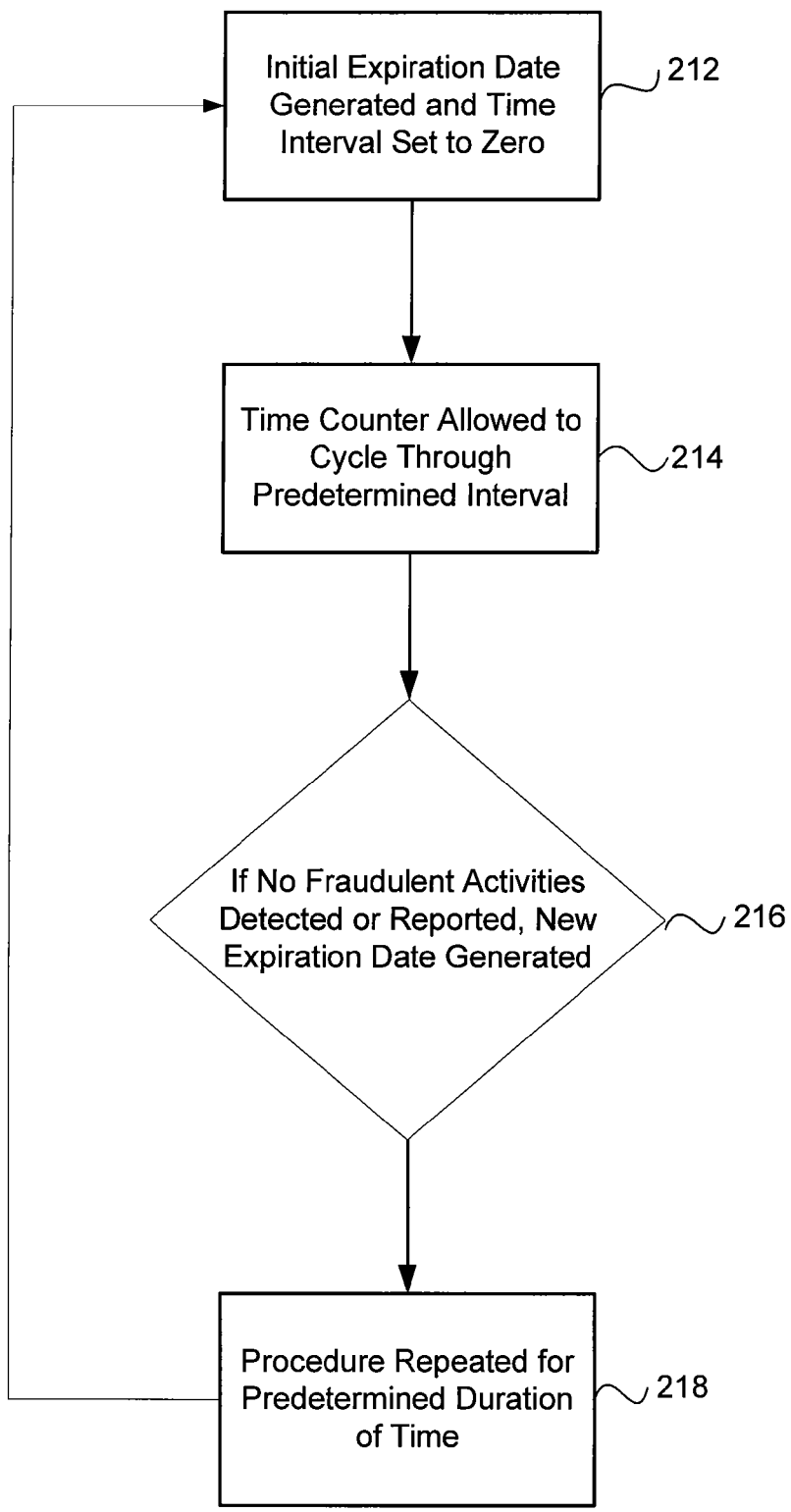
FIG. 2B illustrates an exemplary method of generating expiration dates in accordance with certain embodiments of the invention.

In another aspect of the invention, the transaction instruments of the invention including enhanced expiration date generation mechanisms may be used in financial transactions, including card not present type as well as in-person transactions. For instance, with reference to FIG. 2B, method 211 is illustrated, wherein expiration date generation mechanism is utilized to automatically generate new expiration dates at a predetermined interval for a predetermined duration of time, so long as no fraudulent activities are reported or detected. By way of non-limiting example, fraudulent activities include non-authorized financial transactions, lost or stolen card reports, non-paid account status, inactive accounts, etc., as recognized by those skilled in the art.

Now, at block 212, an initial expiration date is generated by expiration date generation mechanism 112, and the predetermined time interval is set to its initial status indicator, e.g., the predetermined time interval counter is set to zero. At block 214, the time counter is allowed to cycle to the end of its predetermined time interval, e.g., seven days, thirty days, etc. Then, at block 216, if no fraudulent activities have been reported or detected by a transaction facilitator service provider and/or transaction instrument issuer, then a new expiration date is automatically generated by the expiration date generation mechanism 112. This procedure for generating new expiration dates is repeated at block 218 for a predetermined duration of time, e.g., 2 years, 5 years, 6 years, 7 years, 10 years, etc., so long as no fraudulent activities are reported or detected at block 216.

Figure 3:
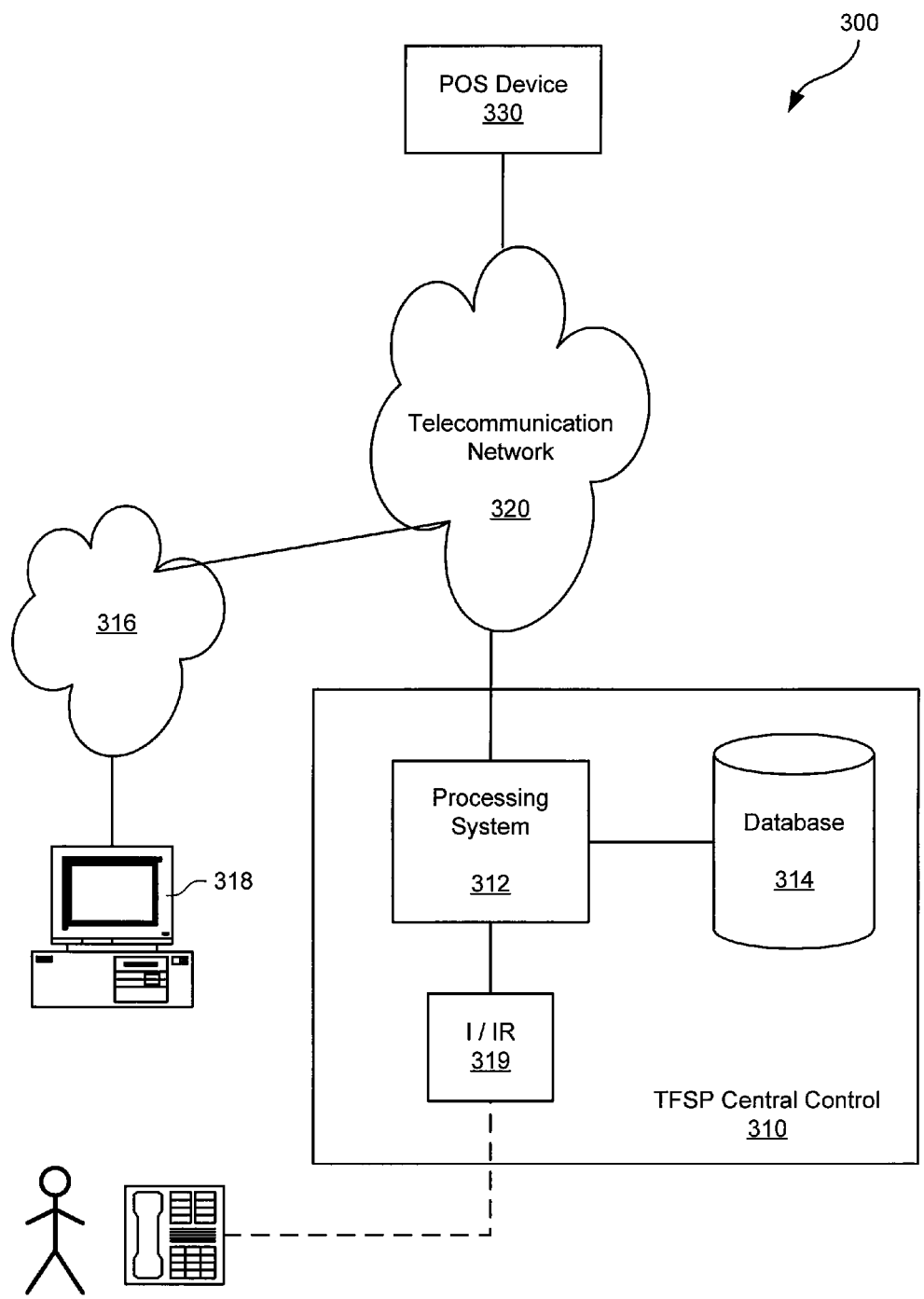
FIG. 3 illustrates an exemplary system for performing a method of the invention.

Referring now to FIG. 3, certain aspects of system 300 that may be used to perform financial transactions using transaction instruments with enhanced expiration date generation and/or security PINs in accordance with the invention is described. In certain exemplary embodiments, system 300 comprises a transaction facilitator service provider central control 310 including a processing system 312, at least one associated database 314, and an Interactive Voice Response ("IVR") unit 319.

Database(s) 314 can be relational databases, such as Oracle databases, that contain records regarding account information, expiration date generation mechanism IDs, security PIN generation mechanism IDs, and associated transaction instruments. This information may include, for example, types of transactions instruments, associated account information, expiration date generation mechanism identifiers (e.g., secure ID token), security PIN generation mechanism identifiers (e.g., secure ID token), associated security PINs, and the like. For instance, the database(s) 314 may comprise account information and security PIN generation ID information associated with identifiable transaction instruments for verification and authentication of the transaction instruments.

Further, any portion or database(s) 314, or a complete database, may be a third party database, or may include third party database information, such as third party databases known in the art for authentication and approval of user identification information. Processing system 312 may be, e.g., a Sun Microsystems workstation, and may work in cooperation with database(s) 314 to permit information to be updated, to permit cards to be issued, to permit transactions to occur, and the like. In certain embodiments, secondary systems and databases (not shown) may optionally retrieve at least a portion of the approvals and authentications from processing system 312 and/or database(s) 314 for communication to, e.g., merchants, financial service providers, and/or users, to facilitate the requested financial transactions or report potential fraudulent activities.

Processing system 312 may receive information from a variety of sources. For example, processing system 312 may be accessed through the Internet 316 by any type of computer 318 (e.g., a consumer personal computer) as is known in the art. Additionally, processing system 312 may be accessed through communication network 320 using, e.g., a POS device 330. Other ways to access processing system 312 include the use of IVR 319, or through a customer service representative (CSR). Any suitable method of communication known in the art may be used to transmit information to processing system 312, database(s) 314, and the various devices, such as via frame network, asynchronous dial-up, VSAT, X.25, lease line, virtual private network (VPN), etc.

As one example, in accordance with method 200, a financial transaction may be initiated using, e.g., POS device 330. Information, such as transaction instrument type, account information, and the like may be gathered by POS device 330, and then transmitted to processing system 312 at a transaction facilitator service provider central control 310. In some embodiments, this information can be gathered by swiping a credit card through a magnetic reader associated with POS device 330, wherein the information is automatically gleaned from the credit card. Other methods of gathering the information are also possible, for example, the information may be gleaned from a smart cart inserted into POS device 330 and the information read via electronic reader interface, POS device 330 may include a bar code reader attached to, for example, an electronic reader interface, that can read a bar code that provides similar information, or a number of other ways of gathering information. One of ordinary skill in the art will recognize other possibilities for garnering information related to providing a stored value card in accordance with the present invention.

In addition to information automatically provided via POS device 330, additional information may be entered via interfaces associated with POS device 330. For example, the generated security PIN from the transaction instrument may be entered via a keypad and/or a touch-screen of POS device 330. The security PIN is then transmitted to processing system 312 at the transaction facilitator service provider.

The information received at POS device 330 may be transferred via communication network 120 to processing system 312. After processing system 312 receives the necessary information, the processing system 312 compares the account information and security PIN against information in database 314 to verify and/or authenticate the transaction instrument. Processing system 312 then communicates whether the transaction instrument has been successfully authenticated to POS device 330 via communication network 320. If the transaction instrument was successfully authenticated, the financial transaction is authenticated.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A transaction instrument with enhanced expiration date generation, the transaction instrument comprising:
    a card body;
    an account identifying mechanism for providing account information associated with the transaction instrument; and
    an enhanced expiration date generation mechanism, wherein a new expiration date is automatically generated at a predetermined interval for a predetermined duration of time, and provided via the enhanced expiration date mechanism;
    wherein the enhanced expiration date generation mechanism is configured so as to be deactivated if fraudulent activity of the transaction instrument is reported or detected such that new expiration dates are not issued and the transaction instrument is allowed to expire at the end of the next predetermined interval.

2. The transaction instrument of claim 1, further comprising a security personal identification number (PIN) generation mechanism, wherein a new security PIN is automatically generated at a predetermined interval and provided via the security PIN generation mechanism.

3. The transaction instrument of claim 1, wherein the expiration date is automatically generated at a predetermined interval selected from the group consisting of: every 24 hours, every seven days, and every 30 days, for a predetermined duration of time selected from the group consisting of: up to about five years, up to about six years, up to about seven years, and up to about 10 years.

4. The transaction instrument of claim 2, wherein the security PIN generation mechanism comprises a random number generator.

5. The transaction instrument of claim 2, wherein the security PIN generation mechanism automatically generates a new security PIN at a predetermined interval between about 60 seconds and seven days.

6. The transaction instrument of claim 2, wherein the security PIN generation mechanism comprises a liquid crystal display (LCD) for displaying the security PIN.

7. The transaction instrument of claim 2, wherein the security PIN generation mechanism comprises at least one machine readable mechanism for providing the security PIN.

8. The transaction instrument of claim 7, wherein the at least one machine readable mechanism is selected from the group consisting of: a smart chip, a RFID tag, and combinations thereof.

9. The transaction instrument of claim 1, wherein the transaction instrument is selected from the group consisting of: credit cards, debit cards, automated teller machine (ATM) cards, phone cards, and stored value cards.

10. The transaction instrument of claim 1, wherein the account identifying mechanism comprises printed account information.

11. The transaction instrument of claim 1, wherein the account identifying mechanism comprises at least one machine readable mechanism.

12. The transaction instrument of claim 11, wherein the at least one machine readable mechanism is selected from the group consisting of: a magnetic stripe, a smart chip, a RFID tag, a MICR line, and combinations thereof.

13. A method for providing enhanced security to financial transactions using transaction instruments, the method comprising:
    initiating a financial transaction between a first party and a second party using a transaction instrument, wherein the transaction instrument comprises:
    a card body;
    an account identifying mechanism for providing financial account information associated with the transaction instrument;
    an enhanced expiration date generation mechanism, wherein a new expiration date is automatically generated at a predetermined interval for a predetermined duration of time, and provided via the enhanced expiration date mechanism, and wherein the enhanced expiration date generation mechanism is configured so as to be deactivated if fraudulent activity of the transaction instrument is reported or detected such that new expiration dates are not issued and the transaction instrument is allowed to expire at the end of the next predetermined interval; and
    a security personal identification number (PIN) generation mechanism, wherein a new security PIN is automatically generated at a predetermined interval and provided via the security PIN generation mechanism;
    providing financial account information associated with the transaction instrument and transmitting the financial account information to a transaction facilitator service provider for verification of the financial account information;
    providing a security PIN generated by the security PIN generation mechanism and transmitting the security PIN to the transaction facilitator service provider for authentication of the transaction instrument;
    providing an expiration date generated by the enhanced expiration date generation mechanism and transmitting the expiration date to the transaction facilitator service provider for authentication of the transaction instrument; and authorizing the financial transaction if the financial account information is verified and the transaction instrument is authenticated.

14. The method of claim 13, wherein the transaction facilitator service provider uses the financial account information as a static identifier to indicate identity of the first party and the security PIN to authenticate identity of the first party via a synchronization-based authentication process.

15. The method of claim 14, wherein the security PIN generation mechanism is configured so as to be recognized as identifiable with the financial account information by the synchronization-based authentication process.

16. The method of claim 13, wherein the transaction instrument is selected from the group consisting of: credit cards, debit cards, automated teller machine (ATM) cards, and stored value cards.

17. The method of claim 13, wherein the account identifying mechanism comprises at least one machine readable mechanism.

18. The method of claim 17, wherein the at least one machine readable mechanism is selected from the group consisting of: a magnetic stripe, a smart chip, a RFID tag, a MICR line, and combinations thereof.

19. The method of claim 13, wherein the security PIN generation mechanism comprises a random number generator.

20. The method of claim 13, wherein the security PIN generation mechanism automatically generates a new security PIN at a predetermined interval between about 60 seconds and seven days.

21. The method of claim 13, wherein the security PIN generation mechanism comprises a liquid crystal display (LCD) for displaying the security PIN.

22. The method of claim 13, wherein the security PIN generation mechanism comprises at least one machine readable mechanism for providing the security PIN.

23. The method of claim 22, wherein the at least one machine readable mechanism is selected from the group consisting of: a smart chip, a RFID tag, and combinations thereof.

24. The method of claim 13, wherein said financial transaction is a card not present type transaction via telephone or the internet.

25. The method of claim 13, wherein the financial transaction is a face-to-face type transaction, and the financial account information and security PIN are transmitted to the transaction facilitator service provider via a point-of-sale device.

26. The method of claim 25, wherein the security PIN is transmitted to the transaction facilitator service provider automatically via the point-of-sale device or entered by hand via the key pad of the point-of-sale device.

27. A system for providing enhanced security to financial transactions using transaction instruments, the system comprising:

transaction facilitator service provider central control in communication with a telecommunication network;

wherein the transaction facilitator service provider central control includes a processing system, at least one associated database, and an optional Interactive Voice Response (IVR) unit; and wherein said at least one associated database comprises account information and expiration date generation information associated with identifiable transaction instruments for verification and authentication of the transaction instruments;

and wherein when fraudulent activity relating to a particular transaction instrument is reported or detected, new expiration dates are not issued and the transaction instrument is allowed to expire at the end of the next predetermined interval.

28. The system of claim 27, wherein the processing system is in communication with at least one Point-of-Sale (POS) device via the telecommunication network.

29. The system of claim 27, wherein the processing system is in communication with at least one consumer personal computer via the telecommunication network.

30. A method for providing enhanced security to financial transactions using transaction instruments, the method comprising:

initiating a financial transaction between a first party and a second party using a transaction instrument, wherein the transaction instrument comprises:

a card body;

an account identifying mechanism for providing financial account information associated with the transaction instrument;

an enhanced expiration date generation mechanism, wherein a new expiration date is automatically generated at a predetermined interval for a predetermined duration of time, and provided via the enhanced expiration date mechanism, and wherein the enhanced expiration date generation mechanism is configured so as to be deactivated if fraudulent activity of the transaction instrument is reported or detected such that new expiration dates are not issued and the transaction instrument is allowed to expire at the end of the next predetermined interval; and providing financial account information associated with the transaction instrument and transmitting the financial account information to a transaction facilitator service provider for verification of the financial account information;

providing an expiration date generated by the enhanced expiration date generation mechanism and transmitting the expiration date to the transaction facilitator service provider for authentication of the transaction instrument; and authorizing the financial transaction of the financial account information is verified and the transaction instrument is authenticated.

31. The method of claim 30, wherein the transaction facilitator service provider uses the financial account information as a static identifier to indicate identity of the first party and the expiration date to authenticate identity of the first party via a synchronization-based authentication process.

32. The method of claim 31, wherein the enhanced expiration date generation mechanism is configured so as to be recognized as identifiable with the financial account information by the synchronization-based authentication process.

* * * * *